(12) United States Patent
Zeglin et al.

(10) Patent No.: US 11,068,999 B1
(45) Date of Patent: Jul. 20, 2021

(54) SOCIAL MEDIA DATA AGGREGATION TO OPTIMIZE UNDERWRITING

(71) Applicant: STATE FARM MUTUAL AUTOMOBILE INSURANCE COMPANY, Bloomington, IL (US)

(72) Inventors: Andrew Joseph Zeglin, Normal, IL (US); Jessica Lynn Shull, Bloomington, IL (US); David Turrentine, Normal, IL (US); Edward W. Breitweiser, Bloomington, IL (US); Melinda Teresa Magerkurth, Utica, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 16/913,463

(22) Filed: Jun. 26, 2020

Related U.S. Application Data

(63) Continuation of application No. 15/637,251, filed on Jun. 29, 2017, now Pat. No. 10,776,878.

(51) Int. Cl.
| | |
|---|---|
| *G06Q 40/08* | (2012.01) |
| *G06Q 50/00* | (2012.01) |
| *H04L 29/08* | (2006.01) |
| *G06Q 50/22* | (2018.01) |
| *G06F 16/9535* | (2019.01) |
| *H04W 4/21* | (2018.01) |

(52) U.S. Cl.
CPC .......... *G06Q 40/08* (2013.01); *G06F 16/9535* (2019.01); *G06Q 50/01* (2013.01); *G06Q 50/22* (2013.01); *H04L 67/306* (2013.01); *H04W 4/21* (2018.02)

(58) Field of Classification Search
CPC ..... G06Q 40/08; G06Q 50/22; G06F 16/9535
See application file for complete search history.

(56) References Cited

U.S. PATENT DOCUMENTS

| | | | |
|---|---|---|---|
| 4,839,804 A | 6/1989 | Roberts et al. | |
| 6,615,181 B1 | 9/2003 | Segal | |
| 7,783,565 B1* | 8/2010 | Ajose | G06Q 40/00 705/38 |
| 9,294,498 B1* | 3/2016 | Yampolskiy | G06F 21/56 |
| 9,300,676 B2 | 3/2016 | Madhu et al. | |
| 2004/0039601 A1 | 2/2004 | Anderson | |
| 2010/0131425 A1 | 5/2010 | Stolerman et al. | |
| 2011/0166895 A1 | 7/2011 | Bakos | |
| 2013/0086641 A1 | 4/2013 | Mehr et al. | |
| 2013/0282571 A1* | 10/2013 | Lundberg | G06Q 10/00 705/40 |
| 2013/0339064 A1 | 12/2013 | Denning et al. | |

(Continued)

*Primary Examiner* — Scott C Anderson
(74) *Attorney, Agent, or Firm* — Marshall, Gerstein & Borun LLP; Randall G. Rueth

(57) ABSTRACT

A data aggregation and processing engine optimizes underwriting decisions in the life insurance industry by using social media data to reduce the level of underwriting required. Social media data enables underwriting thresholds based on risk assessments and credibility correlations within publicly available social media data sets with options for opting into more detailed analysis of private social data. Activity monitors further refine appropriate underwriting actions together with correlations with provided biographical data.

20 Claims, 7 Drawing Sheets

(56) References Cited

U.S. PATENT DOCUMENTS

2016/0210423 A1    7/2016   Tanner, Jr. et al.
2017/0061345 A1    3/2017   Jones, III et al.
2017/0213283 A1*   7/2017   Fine ..................... G06Q 40/08
2017/0287034 A1*   10/2017   Barday ................ G06Q 50/265

* cited by examiner

SOCIAL MEDIA DATA AGGREGATION TO OPTIMIZE UNDERWRITING

CROSS REFERENCE TO RELATED APPLICATION

The present application is a continuation of U.S. patent application Ser. No. 15/637,251, entitled SOCIAL MEDIA DATA AGGREGATION TO OPTIMIZE UNDERWRITING, filed Jun. 29, 2017, the disclosures of which are incorporated herein in their entirety by reference.

FIELD OF THE INVENTION

The disclosure generally relates to systems, methods, apparatus, and non-transitory computer readable media for optimizing underwriting decisions in the life insurance industry using social media data and, more particularly, to reduce the level or underwriting effort based on risk assessments and credibility correlations within available social media data sets.

BACKGROUND

Underwriting in the insurance industry often relies on voluntarily provided biographical information regarding a customer, followed by an assessment of risk based on past claim histories available to a particular company. Because underwriting processes and claim history data, containing personally identifiable information, confidential health information, and proprietary business processes, companies prudently protect and isolate such data. However, in the absence of a full-picture of a prospective customer including all of the available public and private data relevant to, an assessment of underwriting risk may result in substandard and inefficient determinations.

Inaccurate risk assessments may impact availability or affordability of insurance coverage or financial services for some individuals and organizations. Thus, opening the aperture of available data used in underwriting risk assessments, while carefully controlling access to private data allows more accurate risk assessments, improved availability of services, and improving affordability of insurance coverage for users. For organizations providing insurance and financial services, improved risk assessments may increase an accessible customer pool, and provide a better perspective of long term of expected cash flows and lower discount rates associated with those cash flows.

Social media data, both in the public and private space, provides an additional source of risk assessment as well as a variable in correlation to verify provided biographical data. For example, private or publically available social media, when aggregated may provide individual indicators or cumulative effect to assess a mortality risk. Such assessment of mortality risk may provide a threshold for underwriting a life insurance policy, or indicators of risky behavior may prevent underwriting of an auto-insurance policy.

Aggregation engines may collate such private and public social media data on a large scale across a variety of social media outlets to provide a more comprehensive picture. These aggregation engines may require opting in with consent to collect private social media data on a voluntary or temporary basis, or may mine data from publicly available sources on a large scale. Opting to provide access to private social media may require a temporary login credentials, authorized by an account owner in accordance with social media outlet user terms of condition.

Mining public data may require biographical information provided by a prospective customer to correlate with publically available data using a number of markers to establish an identity to a reasonable threshold. On a whole, whether privately or publicly available, the aggregation engine may generate an overall numeric score to compare against a risk assessment threshold. Calculation of the numeric score may relate to a number of variables weighted by the presence of social media activity markers, such as participation in sporting events, wellness initiatives, smoking, alcohol consumption, or other factors that may impact suitability for underwriting an insurance product.

Traditional underwriting processes have typically included an interview between a providing organization and a prospective customer, where biographical information is provided, and an assessment of risk is performed. In some instances, this may be followed-up or preceded by a medical examination to verify or provide information required to perform a risk assessment for an insurance product. The recent availability of wearable device activity data may supplement or in some instances replace more traditional medical assessments in a less invasive and more convenient way. Such wearable data may exist in the public space, where the data may be mined by aggregation engines, or privately opted-in using social media outlets or provided otherwise electronically. This wearable activity data may likewise provide untraditional markers that correlate with provided biographical information or indicate lifestyle habits that suggest or prohibit underwriting insurance products.

In some instances, a mere name and email address may provide sufficient identity information to publically mine available social media outlets to source activity data. Such data may act as a triage first step in an underwriting decision-making process, or fall later in the process to verify and confirm information provided directly by a customer. Still further, organizations may leverage publicly mined and opted-in private social media data to suggest or solicit additional services, or make changes to existing services. Such data may exist on a large scale and require significant computing resources to access, analyze, and generate suggested next steps or prospective product offerings.

Exemplary embodiments may include public or private social media markers for lack of tobacco use allowing a savings for a customer, participation in sporting events such as 5K races or checking-in at sporting events or fitness centers to assess lowered underwriting risk for life insurance policies, etc. Still further, publicly available criminal records, or private credit assessments may indicate activities that prohibit or increase a risk to an underwriting decision for insurance or financial products. Alternatively, use of markers and indicator data may function as a correlation factor to provided data that strengthens or weakens a underwriting risk assessment once a prior assessment has been performed using traditional methods.

SUMMARY

One exemplary embodiment includes a computer-implemented method that includes retrieving a plurality of biographical data related to at least one individual, and providing at least one of the biographical data to a social media data aggregation engine. The method may include retrieving a plurality of social media activity scoring data from the social media data aggregation engine, retrieving a plurality of wearable device activity data related to the at least one individual, and calculating a credibility correlation between the biographical data, the social media activity scoring data, and the wearable device activity data. In some embodiments the method may include calculating an individual underwriting risk assessment score for the at least one individual that includes at least one future cash flow and at least one discount rate. The method may include additional, less, or alternate actions, including those discussed elsewhere herein.

Another exemplary embodiment includes a computer system that includes a computer processor, a memory device, a network device, a human-machine interface, and a display device. In some embodiments, the computer processor may be configured to retrieve a plurality of biographical data related to at least one individual using the human-machine interface and store the plurality of biographical data in the memory device and provide at least one of the biographical data to a social media data aggregation engine using the network device. In other embodiments the computer processor may be configured to retrieve a plurality of social media activity scoring data from the social media data aggregation engine using the network device and store the plurality of social media activity scoring data in the memory device and retrieve a plurality of wearable device activity data related to the at least one individual using the human-machine interface and store the plurality of wearable device activity data in the memory device. The computer processor may in some embodiments be configured to calculate a credibility correlation between the biographical data, the social media activity scoring data, and the wearable device activity data and calculate an individual underwriting risk assessment score for the at least one individual that includes at least one future cash flow and at least one discount rate.

Exemplary embodiments may include computer-implemented methods that may in other embodiments include apparatus configured to implement the method, and/or non-transitory computer readable mediums comprising computer-executable instructions that cause a processor to perform the method.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed herein. It should be understood that each figure depicts an aspect of a particular aspect of the disclosed system and methods, and that each of the Figures is intended to accord with a possible aspect thereof. Further, wherever possible, the following description refers to the reference numerals included in the following Figures, in which features depicted in multiple Figures are designated with consistent reference numerals.

There are shown in the Figures arrangements which are presently discussed, it being understood, however, that the present embodiments are not limited to the precise arrangements and instrumentalities shown, wherein.

The Figures depict preferred embodiments for purposes of illustration only. Alternative embodiments of the systems and methods illustrated herein may be employed without departing from the principles of the invention described herein.

DETAILED DESCRIPTION

Various embodiments of the present disclosure include the collection of social media data and determining correlations with biographical data and traditional underwriting marker activities. Social media underwriting engines may process these sets of social media data and allow truncation of a more traditional insurance underwriting activity or identify candidate products and services otherwise not considered by the user or customer service representative. By providing efficient access to large amounts of otherwise unavailable social media data the efficiency of underwriting risk assessment may be significantly reduced. The efficiency of such risk assessment only improves as the set of available social media data available grows, incentivizing access to larger privately available social media databases.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Underwriting Bypass Based on Social Media Correlations

Figure 1:
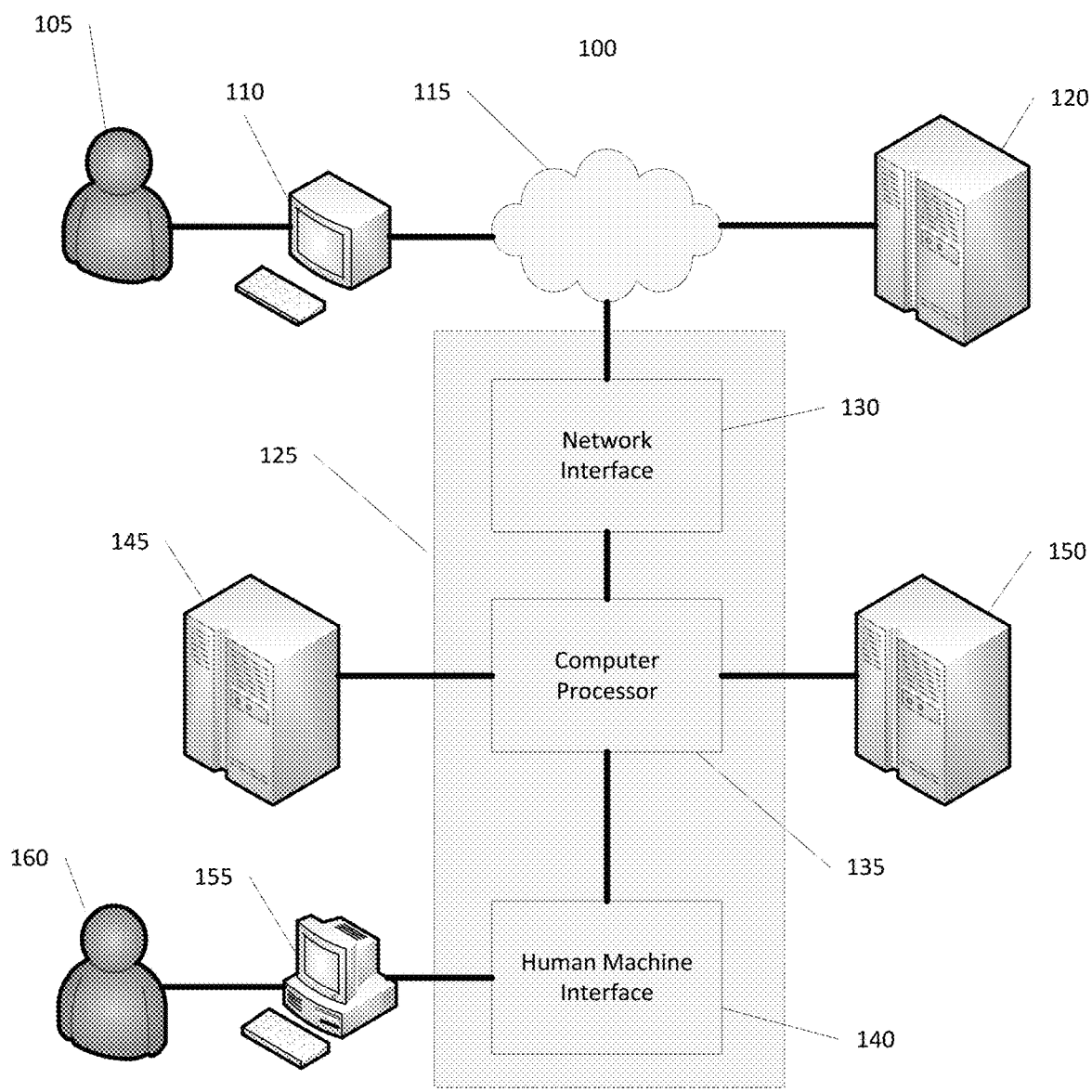
FIG. 1 illustrates an exemplary computer system to collect user biographical information and collate social media data accordance with one aspect of the present disclosure.

FIG. 1 illustrates a block diagram of an exemplary computing system 100 to allow truncation or bypassing an underwriting process using social media data and correlations with provided biographical information. The exemplary system 100 enables a user 105 to interface with a user terminal 110 to transmit a request through a computer network 115 and network interface 130 for insurance or financial services that may require an underwriting risk determination. Such an request may, in one embodiment, result from an earlier initiation or solicitation by a customer service representative 160, interfacing with a service terminal 155, interacting through a human-machine interface 140. In another embodiment, the insurance or financial transaction may result from a user initiated request, absent the representative 160. Still further, the user 105 may transmit wearable device data using the user terminal 110, for example using a wired or wireless interface to the user terminal 110.

The network interface 130 may encode the request for insurance or financial services in an electronic format such that the computer processor 135 may read and process the request. Likewise, the human-machine interface 140 may encode in an electronic format solicitation, communications, and customer interactions from the representative 160 and service terminal 155 such that the computer processor 135 may read and process the communications and interactions.

The processor 135 may in one embodiment include a single processor, or in another embodiments include a variety of interconnected processors that operate in concert to efficiently perform tasks in parallel. The processor 135 may, in one embodiment, interface to a social media data server 150, and a transaction server 145, storing respectively, a aggregated social media data and sets of financial and insurance underwriting transaction data. In other embodiments, the social media data and/or transaction data may reside on the same server.

The computer processor 135 includes an interface to a network interface 130, that may in one embodiment include wired and wireless interfaces to allow communication over any variety of computer networks communicating over a variety of mediums. One such embodiment includes an interface to a network 115, for example a wide-area network such as the Internet, that interconnects any number of computing devices, for example a remote transaction and/or social media data server 120, over wired or wireless networks, or over one or more radio frequency links or wireless or digital communication channels. In another embodiment, the network 115 may comprise a local-area network with access controls to a specific entity, such as a business.

In one embodiment, a social media underwriting engine 125, may comprise the human-machine interface 140, computer processor 135, and network interface 130. However, in other embodiments the social media underwriting engine 125 may include other digital and analog interface devices, memory devices, and supplemental processing devices for performing calculations and storing data.

Figure 2:
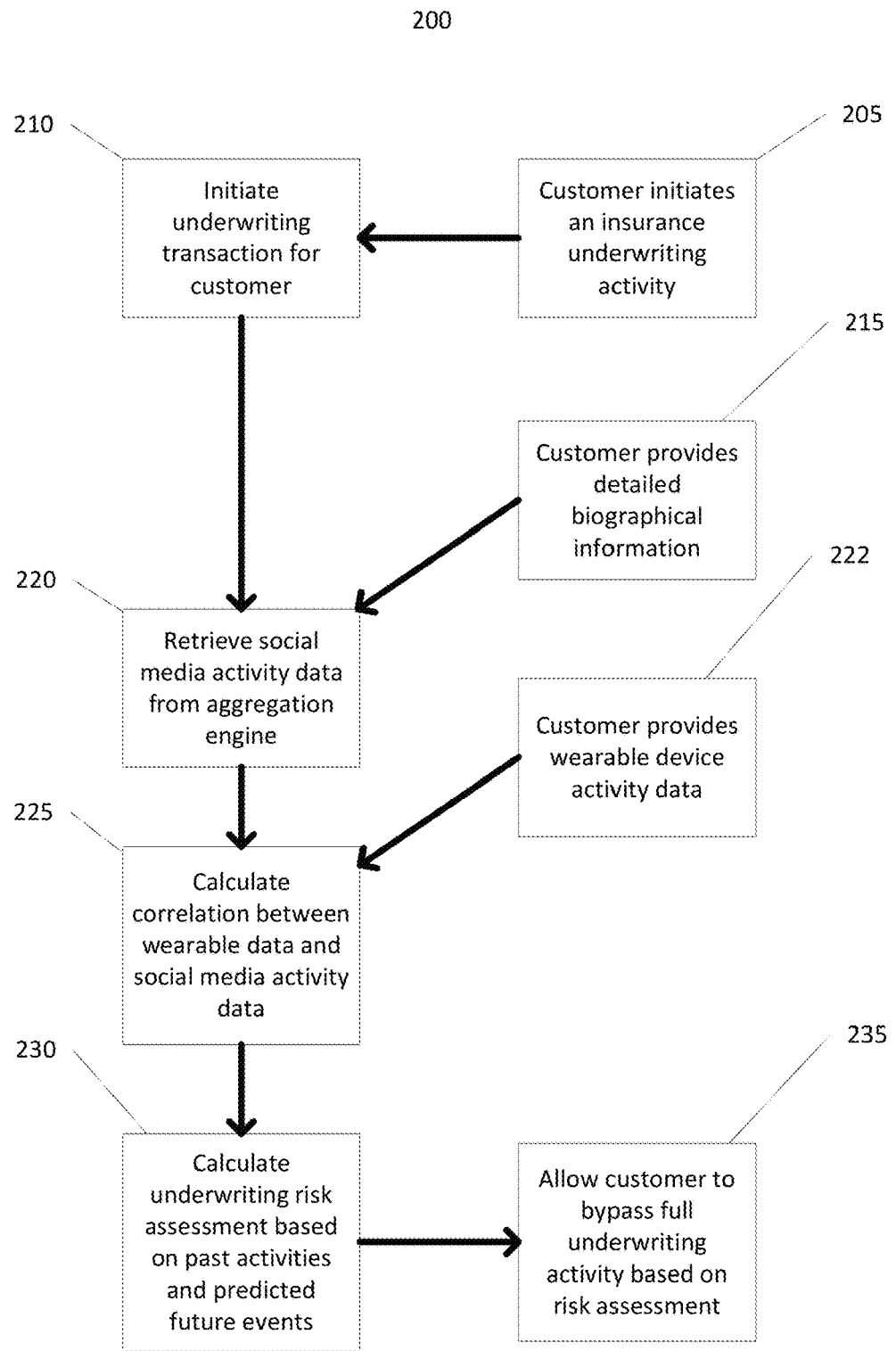
FIG. 2 illustrates an exemplary computer-implemented method to bypass or truncate an underwriting process using social media data in accordance with one aspect of the present disclosure.

In accordance with one aspect of the present disclosure, the system 100 may perform a portion of the method 200, as illustrated in FIG. 2. However, the method 200 does not, or may not, specifically require the system 100, or the elements included therein in a particular arrangement, to perform the method steps illustrated in the process 200.

In one embodiment, a customer, for example the customer 105 of FIG. 1, may initiate an insurance underwriting transaction (block 205) that may require a risk assessment. A system, for example the social media underwriting engine 125 of FIG. 1, may initiate the underwriting transaction (block 210) for the customer. Examples of underwriting transactions may include initiation of a new life, auto, or homeowners insurance policy, making changes to an existing insurance policy such as adding covered persons or assets. Such transactions may require the issuing organization to perform a risk assessment to assess suitability for a new insurance product or changes to an existing product. As such, a customer may provide detailed biographical information (block 215) associated with or required by the underwriting guidelines of the requested insurance product.

Biographical information may include a full legal name, age, gender, occupation, address, medical information, past insurance claim history, or other biographical information relevant or necessary for the insurance underwriting process. However, in many instances such information is provided only under penalty of perjury or governed by the laws and regulations of a particular state that prohibit fraud or providing false information in the acquisition of insurance products. In many cases the cost to an organization of a fraudulently acquired insurance product far outweighs any collection mechanism available. Therefore, verifying such information at the initiation of an insurance underwriting process provides financial and administrative benefits.

Using the provided biographical information from a customer, a social media underwriting engine may retrieve social media activity data from an aggregation engine (block 220), such as a database or from an outside vendor. Retrieving such social media data may result in a scoring mechanism related to particular marker activities, such as smoking, participation in sporting activities such as 5K races, or verification of biographical information such as occupation, or participation in risky activities. In other embodiments, the social media activity data may provide scoring thresholds indicating the completeness of data relating to particular biographical information, such as identity resolution, verifying age, or occupation. An outside vendor may provide the social media activity data over a computer network or the data may be collated in an internal server owned by an organization.

In another embodiment, the customer may provide data related to wearable device activity (block 222). Such wearable device activity data may include a number of steps, maximum or average heart rate over time, resting heart rate, number of hours slept and quality of sleep, frequency or intensity of exercise, or other markers of physical activity. Biographical data provided otherwise by the user may correspond to such markers of physical activity and relate to requirements of the underwriting process for insurance products. Thus, mechanisms to verify such correlations may reduce the risk of the underwriting process and establish credibility of the biographical data provided by the user.

A social media underwriting engine may collate some, or all of the social media data and wearable device activity data, and calculate correlations between provided biographical information (block 225). Such correlations may include a single weighted statistical measure that scores the credibility of the biographical submission of the user, or may in other embodiments include a variety of correlation scores for particular underwriting markers, such as smoking, age, occupation, or other biographical information.

In some embodiments, the correlation of provided biographical information to the presence or absence of particular markers of activity in social media or wearable device activity data increases or decreases the risk of an underwriting activity, such as initiation of an insurance policy, adding a person to an insurance policy, or changing a level of coverage. Thus calculating an underwriting risk based on past activities and predicted future events using such correlations (block 230) may allow truncation or elimination of more lengthy or significant portions of an underwriting decision making process. For example, by establishing credibility of user answers to biographical questions may avoid a physical examination by a licensed physician, avoid a credit check, and truncate a question and answer form or in-person or telephone interview. Thus, providing, retrieving, and processing social media and/or wearable data may in some embodiments allow a customer to bypass a full underwriting activity based on such a risk assessment (block 235).

Tailored Services Based on Social Media Risk Threshold

Figure 3:
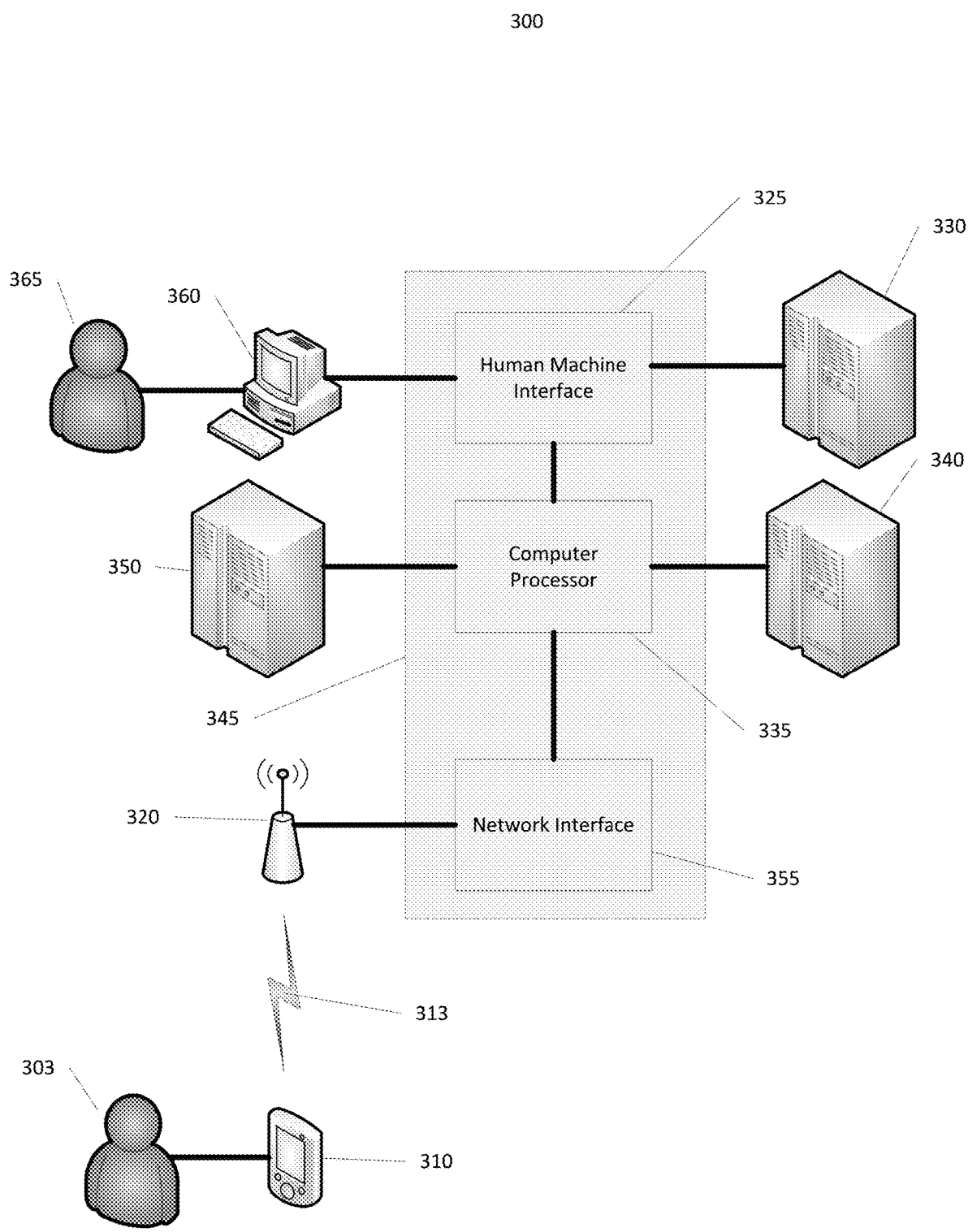
FIG. 3 illustrates an exemplary computer system to modify an existing set of customer services in accordance with one aspect of the present disclosure.

FIG. 3 illustrates a block diagram of an exemplary computer system 300 to tailor a set of services offered or solicited to a customer based on a threshold calculated from social media data. In one embodiment, the exemplary system 300 enables a user 303 to interface with a portable device 310 over a wireless connection 313 and a wireless networking device 320 to initiate an insurance or financial transaction. The wireless connection 313 and wireless networking device 320 may include a cellular data and voice service and the portable device 310 may include a smartphone with data capabilities. Such a request may, in one embodiment, involve an earlier initiation by a customer service representative 365, interacting with a service terminal 360. In another embodiment, the transaction may result from a user initiated request, absent the representative 365.

In the exemplary embodiment illustrated in FIG. 3, the portable device 310 interfaces through a wireless network 313 to a networking device 320 and network interface 355 via wireless communication or data transmission over one or more radio links or wireless, digital communication channels. The networking device 320 may include any of a variety of local or wire-area networks, for example the Internet, or a corporate intranet with access controls. The network interface 355 may provide interfaces and translation capabilities allowing a processor 335 to communicate using a variety of network protocols, among a variety of network layers, in parallel and serially.

A human-machine interface 325, together with the network interface 355, and the processor 335, may comprise a social media underwriting engine 345, in one embodiment. In another embodiment, the social media underwriting engine 325 may include additional components, for example memory devices, processing engines, and interfaces, not illustrated, to perform required functions. The processor 335 may include interfaces to a social media data server 340 and insurance transaction server 350, according to one embodiment. The human-machine interface 325 may include interfaces to a service terminal 360 used by the customer service representative 365 and an external biographical data server 330.

Figure 4:
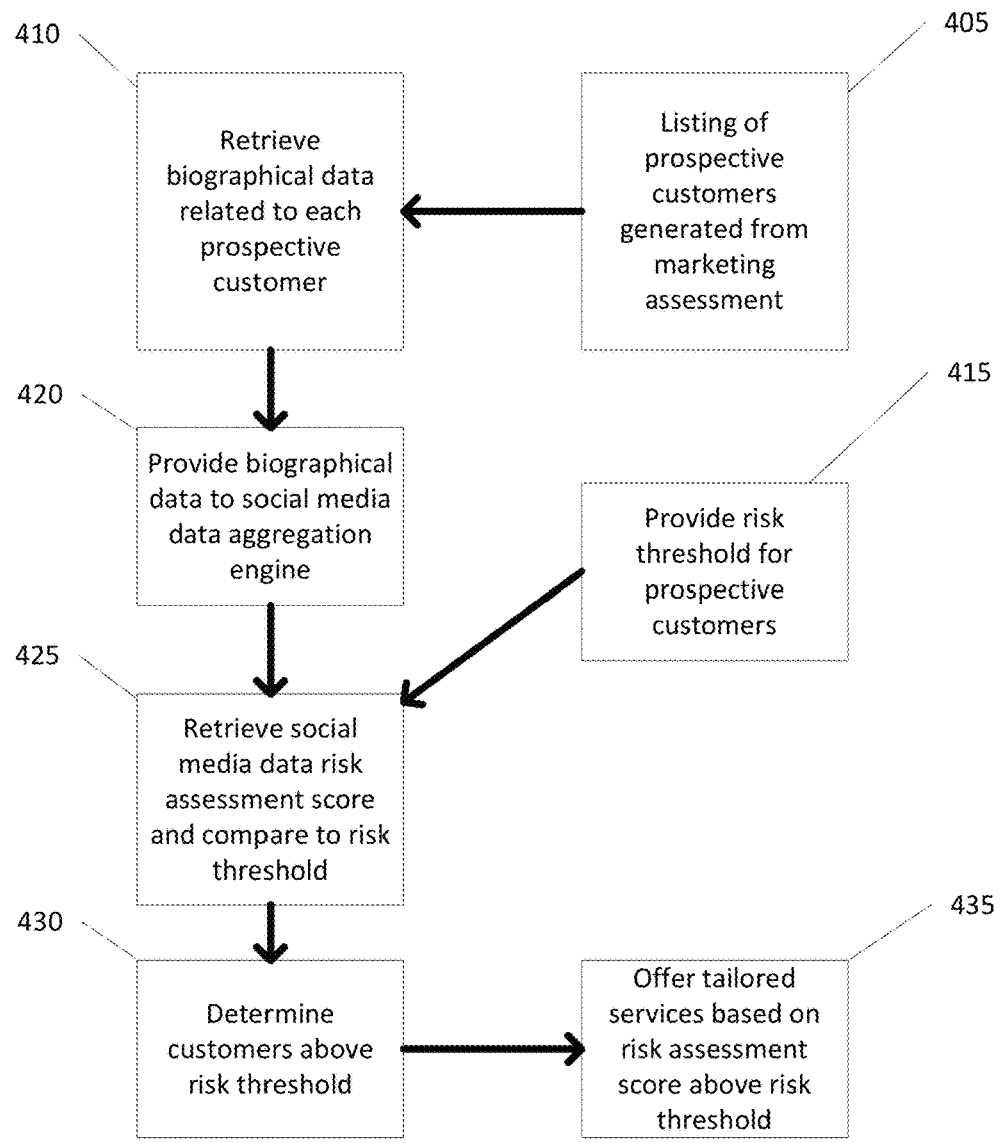
FIG. 4 illustrates an exemplary computer-implemented method to tailor a set of existing services based on a social media risk threshold in accordance with one aspect of the present disclosure.

In accordance with one aspect of the present disclosure, the system 300 may perform the method 400, as illustrated in FIG. 4. However, the method 400 does not specifically require the system 300, or the elements included therein in a particular arrangement, to perform the method steps illustrated in the process 400.

In one embodiment, a social media underwriting engine, for example the engine 325 of FIG. 3, may generate a listing of prospective customers generated from a marketing assessment (block 405). Such a listing may be initiated by initial contact by a customer in regards to a change in an existing insurance policy. However, in other embodiments, a customer service representative may initiate such a listing independently. The engine may retrieve biographical information related to each prospective customer (block 410). Such biographical information may include identity including full name, age, occupation, indications of health related behaviors such as smoking, and other factors that may impact an insurance underwriting decision. The engine may retrieve the biographical information from a biographical information server using a name, email address, telephone number, or other personal information. In other embodiments, the user may provide some, none, or all of the biographical information to the customer service representative.

The engine may provide the retrieved biographical data to an external or internal social media data server, or aggregation engine (block 420). In another embodiment, the customer service representative may provide a risk threshold for prospective customers (block 415) appropriate to a particular insurance underwriting requirement. The engine, working with an external or internal social media data server, may retrieve a social media risk assessment score and compare such a score to a provided risk threshold (block 425). In one embodiment, such a provided social media risk assessment score may include risk assessments related to traditional markers in a life insurance mortality, such as smoking, criminal activity, creditworthiness, or other required risk assessments or underwriting requirements. The retrieved score may include a number of scoring and weighting factors, or simply one score.

One customer, or a variety of customers may exceed or fall below the provided threshold, thus excluding or indicating a particular customer remains a candidate for an insurance or financial services product (block 430). Such an assessment, made in one embodiment by the engine, may offer tailored services based on the risk assessment score above the provided threshold (block 435) or in another embodiment exclude or include a customer in a singular case. Such an assessment may occur as a portion of a larger insurance transaction, while changing insurance products, or during a new customer interaction. In other embodiments the assessment may occur entirely unprompted as a marketing effort for new customers.

Biographical Correlation with Private Social Media Data

Figure 5:
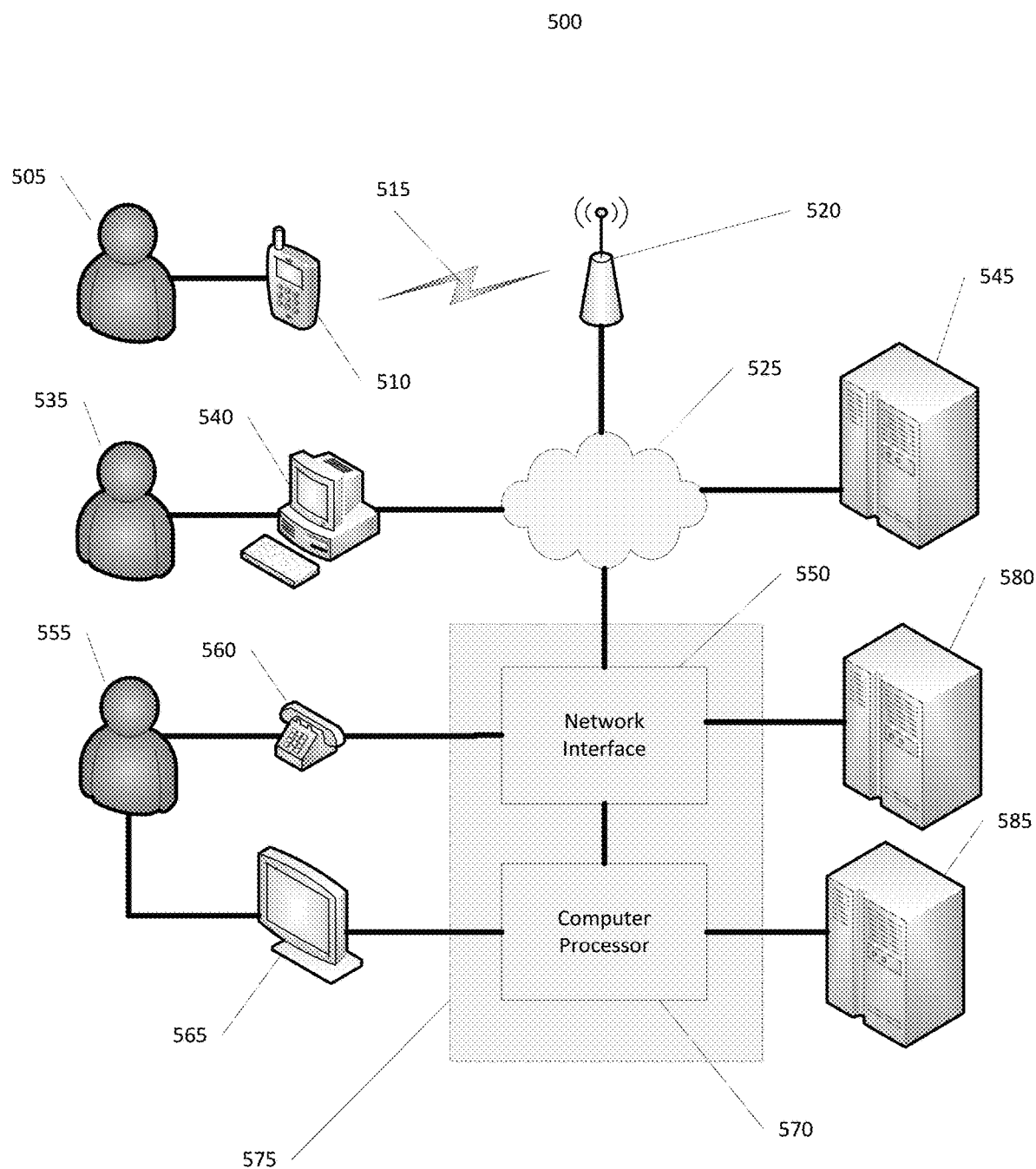
FIG. 5 illustrates an exemplary computer system to verify provided biographical data using social media data in accordance with one aspect of the present disclosure.

FIG. 5 illustrates a block diagram of an exemplary computer system 500 to determine a correlation between provided biographical information, public social media data, and private social media data. The exemplary system 500 enables a user 505 to interface with a mobile device 510 to initiate or inquire regarding an insurance transaction that involves an underwriting risk assessment. Such a request may, in one embodiment involve an earlier initiation by a customer service representative 555, interacting with a telephone 560 and a display screen 565, or a remote service representative 535 interacting with a service terminal 540 over a computer network 525. In another embodiment, the transaction may result from a user initiated request, absent any of the representatives 555 and 535.

The mobile device 510 may communicatively couple through a wireless interface device 520, according to one embodiment. Such a wireless interface device 520 may comprise a WiFi access point, for example in accordance with IEEE Std 802.11, or any of a variety of cellular or mobile access point equipment required to translate wireless digital and analog signals into signals within a computer network. The wireless interface device 520 may in various embodiments include a plurality of interface devices within, for example a cellular data infrastructure network commercially available for consumer or business use. In some embodiments, the wireless interface device 520 may interface to a computer network 525, such as the internet.

The computer network 525 may interface through a network interface 550 to a processor 570 disposed for example within a social media underwriting engine 575, according to one embodiment of the present disclosure. Other embodiments of the social media underwriting engine 575 may include a variety of memory devices, interface devices, and processing devices, to execute required functions. The computer processor 570 may interface to a social media data server 585 and an insurance transaction server 580, in one embodiment, and may interface to a remote transaction server 545 via the network interface 550 and computer network 525. A customer service representative 555 may interface with the telephone 560 and display 565 or a remote service representative 535 may interface with a service terminal 540 to initiate and interact with the customer 505.

Figure 6:
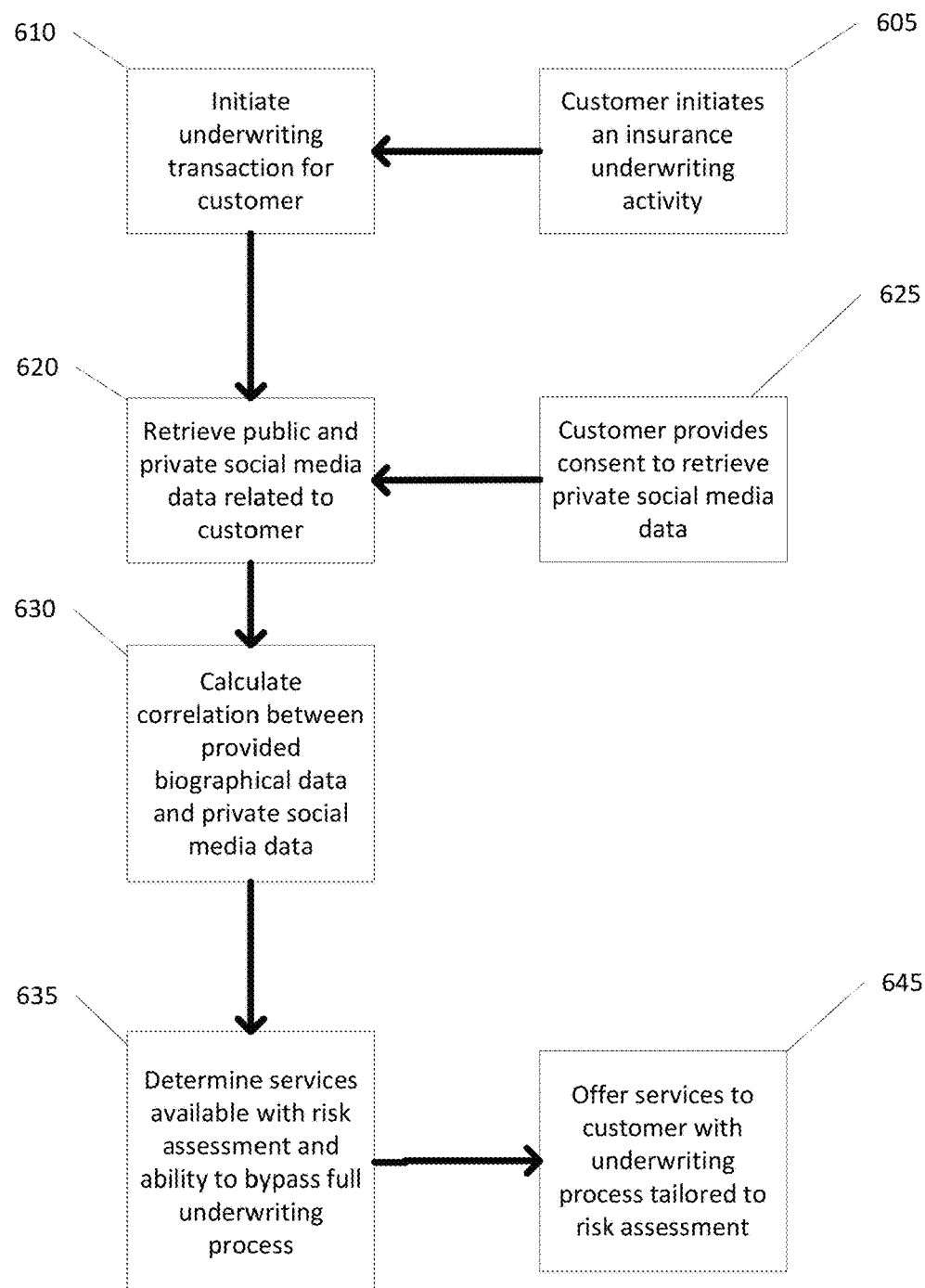
FIG. 6 illustrates an exemplary computer-implemented method to correlate biographical information with social media data in accordance with one aspect of the present disclosure.

In accordance with one aspect of the present disclosure, the system 500 may perform the method 600, as illustrated in FIG. 6. However, the method 500 does not specifically require the system 500, nor do the elements included therein require a particular arrangement, to perform the method steps illustrated in the process 600.

While data aggregation may occur using a variety of publicly available social media data, in some embodiment private social media data, available on an invitation-only basis, may provide a more precise assessment of social activity. Such an assessment using private social media data may allow identification of candidate products that may not be readily apparent from provided biographical data or publically available social media data. In one instance, a customer may initiate an insurance underwriting activity (block 605), for example initiating a new life insurance policy that requires a risk assessment.

A social media underwriting engine may initiate the transaction (block 610) and retrieve publicly available social media data associated with any biographical information available from the customer. As an incentive to possibly truncate or eliminate portions of the traditional full underwriting process, the customer may provide consent, consistent with the terms and conditions of social media outlets, as well as in compliance with local, state, and federal laws and regulations, to retrieve private social media data (block 625). The engine may retrieve such private social media data together with publicly available social media data related to the initiating customer (block 620).

For a variety of insurance underwriting markers, such as smoking, age, health case history, physical activity, or otherwise, the engine may calculate a correlation between the provided biographical information related to the customer and the private social media data (block 630). In other embodiments, the engine may calculate correlations between private and public social media data in addition to the provided biographical information. Such correlations may better establish the credibility of the customer with regard to provided biographical information, and identify candidate products and services above and beyond the initial service solicited. The credibility of the customer may correspond to risk markers in the underwriting process, for example the need for a medical examination or additional questions related to health care history or lifestyle activities.

With the calculated correlations and assessment of credibility the engine may determine services available with the risk assessment and assess the ability to bypass a full underwriting process (block 635). For example, a negative answer in biographical information on tobacco product use, together with similar data in public and private social media data, may result in a lowered premium, access to additional life insurance policy features, or a truncated required medical background history during underwriting. As such, the engine, and the customer service representative may offer services to the customer with the underwriting process tailored to the risk assessment (block 645).

Exemplary Computing Systems and Readable Mediums

Figure 7:
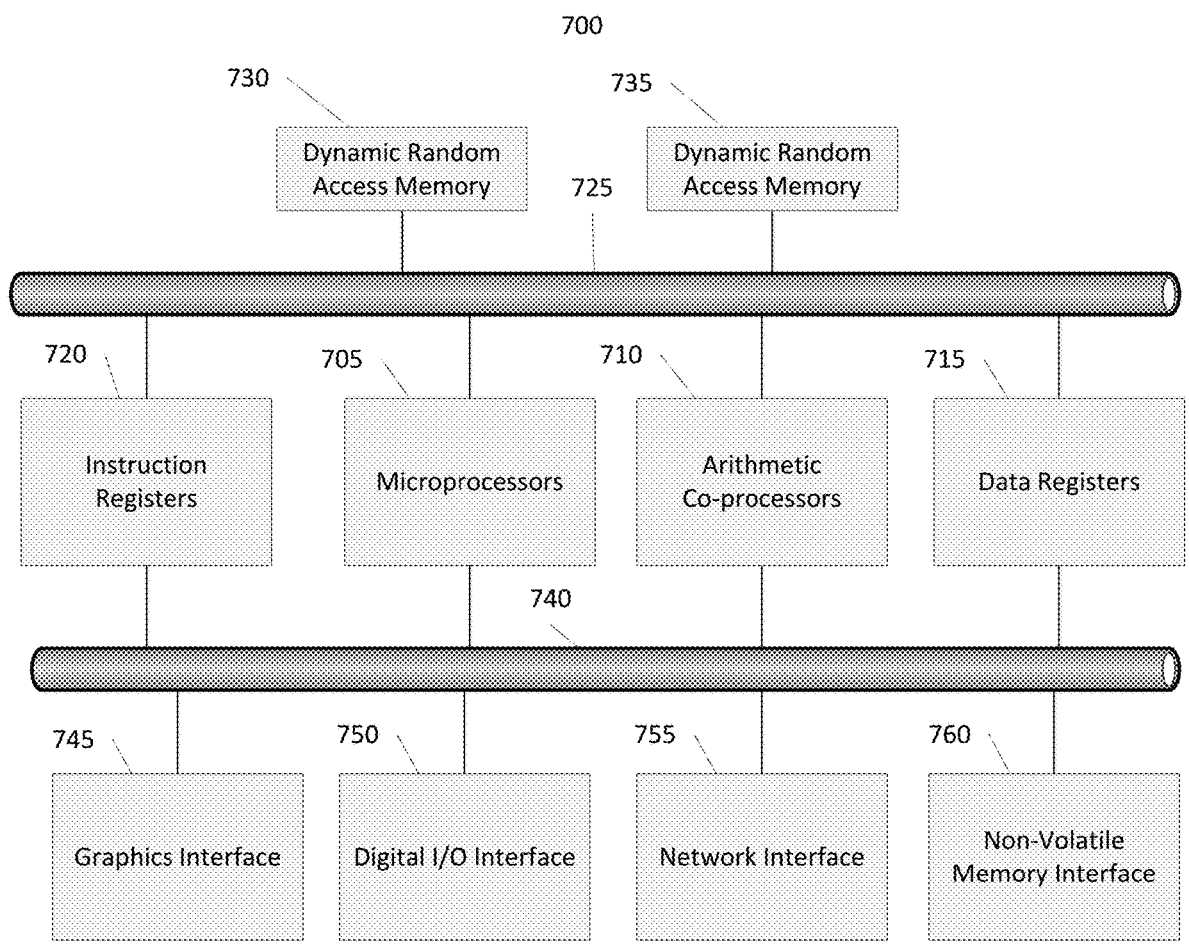
FIG. 7 illustrates an exemplary computing system to in accordance with one aspect of the present disclosure.

FIG. 7 illustrates an exemplary computing system 2700 in accordance with the embodiments disclosed in FIGS. 1-6 and 8. The exemplary computing system 700 and components disclosed therein may comprise part, all, or none of the disclosed embodiments of FIGS. 1-6 and 8. The system 700 includes one or more microprocessors 705, coupled to supporting devices through multi-access busses 725 and 740. Dynamic random access memory 730 and 735 may interface to data bus 725, and store data used by the one or more microprocessors 705. The system 700 includes instruction registers 720 that store executable instructions for the one or more microprocessors 705, and data registers 715 that store data for execution. In some embodiments, the system 700 includes one or more arithmetic co-processors 710, to assist or supplement the one or more microprocessors 705.

Data bus 740 includes interfaces to a graphics interface 745 that may in some embodiments process and transmit graphical data for a user on a display or similar devices. Likewise, data bus 740 includes interfaces for a digital I/O interface that processes and transmits, for example, keyboard, pointing device, and other digital and analog signals produced and consumed by users or other machines. A network interface 755 processes and transmits encoded information over wired and wireless networks to connect the system 700 to other machines and users. Data bus 740 also includes at least one interface to a non-volatile memory interface, that may process and transmit data that resides on non-volatile memory devices.

Figure 8:
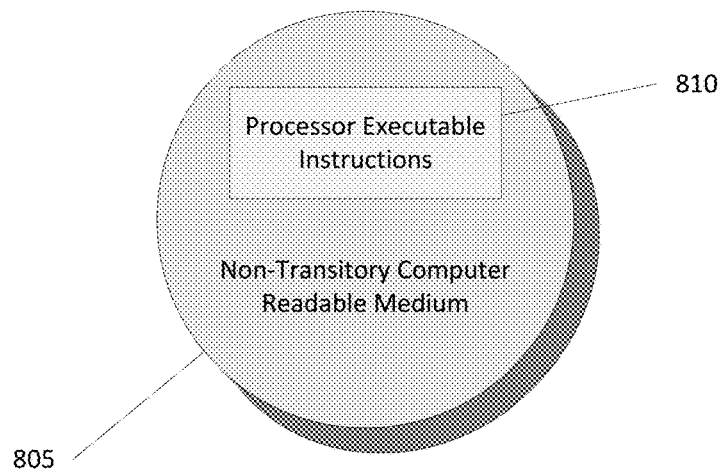
FIG. 8 illustrates an exemplary article of manufacture in accordance with one aspect of the present disclosure.

FIG. 8 illustrates a non-transitory computer readable medium 805, that comprises processor executable instructions 810. Such processor executable instructions may include instructions executed by the one or more processors 705 of FIG. 7, such as described herein, for example in the methods 200, 400, and 600.

Social Media Data Aggregation

In certain embodiments, social media aggregation discussed herein may include mass data mining of social media outlets to collect publicly available data shared voluntarily. For instance, a processor or a processing element may, in coordination or independently of a variety of social media outlets, collect a variety of social media marker data. The aggregated social media data may identify patterns of behavior, indicated in behavior scoring, or simply with binary presence or absence indicators. Such data may be provided by a commercial entity as a data service on a subscription or per use basis. Social media aggregation services may facilitate the retrieval of private social media data, with appropriate authorizations and in accordance with the terms and conditions of social media outlets and applicable local, state, and federal laws and regulations regarding the handling of private, personally identifiable information, or healthcare protected data.

Examples of social media outlets may include text based information provided by a user, relating to recent activity, location tagging in coordination with a particular activity, and associations with other social media users. For example, a criminal activity markers may correlate if a particular user is within a number of degrees of separation from another user with an activity marker, for example if a user is involved in criminal activity. Time based markers may further correlate activity markers, for example if smoking is indicated more than 5 years ago with smoking cessation activities indicated in the interim.

Wearable device activity data may in some embodiments include digitally recorded data from a smart watch, GPS receiver, heart rate detector, accelerometers in smartphones or otherwise that determine a level or intensity of physical activity or location. The wearable device may include capabilities to determine a type or feature of the activity for recording within the device or an external device over a period of time. Such wearable device activity data may transfer to a user's computer or smartphone wirelessly or coupled to a computing device to store or forward such data onto an insurance company using computer networks. In one embodiment, the wearable device activity data may reside in a third-party vendor database with login credentials made available to an insurance company for the purpose of verifying or identifying activity otherwise indicated in provided biographical data.

In one embodiment, a processing element (and/or social media underwriting engine discussed herein) may be trained by providing it with a large sample of images and/or social media data with known characteristics or features. Based upon these analyses, the processing element may learn how to identify characteristics and patterns that may then be applied to analyzing user device details, user request or login details, user device sensors, geolocation information, image data, the insurer database, a third-party database, and/or other data. For example, the processing element may learn, with the user's permission or affirmative consent, to identify the user and/or the asset that is to be the subject of a transaction, such as generating an insurance quote or claim, opening a financial account, handling a loan or credit application, processing a financial (such as a credit card) transaction or the like.

Additional Considerations

All of the foregoing computer systems may include additional, less, or alternate functionality, including that discussed herein. All of the computer-implemented methods may include additional, less, or alternate actions, including those discussed herein, and may be implemented via one or more local or remote processors and/or transceivers, and/or via computer-executable instructions stored on computer-readable media or medium.

The processors, transceivers, mobile devices, service terminals, servers, remote servers, database servers, social media and wearable device data servers, transaction servers, and/or other computing devices discussed herein may communicate with each via wireless communication networks or electronic communication networks. For instance, the communication between computing devices may be wireless communication or data transmission over one or more radio links, or wireless or digital communication channels.

Customers may opt into a program that allows them share mobile device and/or customer, with their permission or affirmative consent, with a service provider remote server. In return, the service provider remote server may provide the functionality discussed herein, including security, fraud, or other monitoring, and generate recommendations to the customer and/or generate alerts for the customers in response to abnormal activity being detected.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

This detailed description is to be construed as exemplary only and does not describe every possible embodiment, as describing every possible embodiment would be impractical, if not impossible. One may be implement numerous alternate embodiments, using either current technology or technology developed after the filing date of this application.

What is claimed is:

1. A computer-implemented method, executed with a computer processor, comprising:
   generating a list of prospective customers;
   retrieving an at least one biographical data related to each prospective customer;
   providing at least one of the biographical data for each prospective customer to a social media data aggregation engine;
   training the social media data aggregation engine, wherein the training includes:
      providing the social media data aggregation engine with a large sample of social media data with known characteristics or features of the prospective customers;
   retrieving a plurality of social media activity scoring data for each prospective customer using the trained social media data aggregation engine;
   calculating a social media data risk assessment score for each prospective customer from the social media activity scoring data using the trained social media data aggregation engine;
   comparing the social media data risk assessment score for each prospective customer to a risk threshold;
   determining which customers are above the risk threshold;
   aggregating a list of prospective customers above the risk threshold to which tailored underwriting services are offered.

2. The method of claim 1, wherein the biographical data comprises at least one of individual's full name, age, gender, occupation, tobacco use, alcohol use, criminal activity, creditworthiness, activity level, history of medical procedures, participation in wellness activities, and physical fitness.

3. The method of claim 1, wherein retrieving a plurality of social media activity scoring data comprises:
   retrieving a consent to retrieve private social media data;
   retrieving a plurality of private social media activity scoring data from the social media data aggregation engine; and
   calculating the social media data risk assessment score using at least one of the private social media activity scoring data.

4. The method of claim 1, wherein the social media aggregation engine comprises publicly available data related to the at least one individual.

5. The method of claim 1, wherein the individual social media data risk assessment score correlates to a mortality risk.

6. The method of claim 5, wherein the mortality risk comprises at least one of smoking, alcohol use, drug use, or criminal activity.

7. The method of claim 1, wherein retrieving an at least one biographical data comprises retrieving the at least one biographical data related to at least one individual from a human-machine interface that renders a plurality of interview questions on a display device.

8. The method of claim 1, wherein retrieving an at least one biographical data comprises retrieving a plurality of wearable device activity data from a wearable device that records an activity level of the least one individual.

9. The method of claim 1, wherein the method further comprises training a social media data risk assessment algorithm to identify patterns.

10. The method of claim 9, wherein the trained social media data risk assessment algorithm is further used to analyze at least one of: (i) user device details, (ii) user request or login details, (iii) user device sensors, (iv) geolocation information, (v) image data, (vi) the insurer database, or (vii) a third-party database.

11. A computer system, comprising:
    a computer processor;
    a memory device;
    a network device;
    a human-machine interface; and
    a display device;
    wherein the computer processor is configured to:
       generate a list of prospective customers;
       retrieve an at least one biographical data related to each prospective customer;
       provide at least one of the biographical data for each prospective customer to a social media data aggregation engine;
       train the social media data aggregation engine, wherein the training includes:
          providing the social media data aggregation engine with a large sample of social media data with known characteristics or features of the prospective customers;
       retrieve a plurality of social media activity scoring data for each prospective customer using the trained social media data aggregation engine;
       calculate a social media data risk assessment score for each prospective customer from the social media activity scoring data using the trained social media data aggregation engine;
       compare the social media data risk assessment score for each prospective customer to a risk threshold;
       determine which customers are above the risk threshold; and
       aggregate a list of prospective customers above the risk threshold to which tailored underwriting services are offered.

12. The system of claim 11, wherein the biographical data comprises at least one of individual's full name, age, gender, occupation, tobacco use, alcohol use, criminal activity, creditworthiness, activity level, history of medical procedures, participation in wellness activities, and physical fitness.

13. The system of claim 11, wherein retrieving a plurality of social media activity scoring data comprises:
    retrieving a consent to retrieve private social media data;
    retrieving a plurality of private social media activity scoring data from the social media data aggregation engine; and
    calculating the social media data risk assessment score using at least one of the private social media activity scoring data.

14. The system of claim 11, wherein the social media aggregation engine comprises publicly available data related to the at least one individual.

15. The system of claim 11, wherein the individual social media data risk assessment score correlates to a mortality risk.

16. The system of claim 15, wherein the mortality risk comprises at least one of smoking, alcohol use, drug use, or criminal activity.

17. The system of claim 11, wherein retrieving an at least one biographical data comprises retrieving the at least one biographical data related to at least one individual from a human-machine interface that renders a plurality of interview questions on a display device.

18. The system of claim 11, wherein retrieving an at least one biographical data comprises retrieving a plurality of wearable device activity data from a wearable device that records an activity level of the least one individual.

19. The system of claim 11, wherein the method further comprises training a social media data risk assessment algorithm to identify patterns.

20. The system of claim 19, wherein the trained social media data risk assessment algorithm is further used to analyze at least one of: (i) user device details, (ii) user request or login details, (iii) user device sensors, (iv) geolocation information, (v) image data, (vi) the insurer database, or (vii) a third-party database.

* * * * *